United States Patent [19]
Holzhauser

[11] 3,735,417
[45] May 22, 1973

[54] TEMPERATURE REGULATING HEAT-RECORDING STYLUS
[75] Inventor: Emil A. Holzhauser, Fort Washington, Pa.
[73] Assignee: Honeywell Inc., Minneapolis, Minn.
[22] Filed: Oct. 26, 1971
[21] Appl. No.: 192,391

[52] U.S. Cl..................346/139 C, 219/504, 338/22, 346/76 R
[51] Int. Cl..............................................G01d 15/10
[58] Field of Search ........................346/76 R, 139 C; 338/22; 219/504, 241

[56] References Cited
UNITED STATES PATENTS

| | | |
|---|---|---|
| 2,976,505 | 3/1961 | Ichikawa............................338/22 R |
| 3,243,753 | 3/1966 | Kohler...............................219/241 X |
| 3,327,312 | 6/1967 | Hamilton et al.....................346/76 X |
| 3,584,190 | 6/1971 | Marcoux...........................219/241 X |

Primary Examiner—Joseph W. Hartary
Attorney—Arthur H. Swanson et al.

[57] ABSTRACT

A recording apparatus for recording on heat-sensitive material including a recording stylus having a mandrel of an electrically insulating material capable of withstanding an elevated recording temperature. Electrical conductors are deposited on the surface of the mandrel to electrically connect a source of electrical power to a themister forming a characterized recording end of the mandrel and having a positive temperature coefficient of resistance. The mandrel is attached to a stylus support arranged to be selectively driven across a recording material with the electrical conductors being electrically isolated from the stylus support.

8 Claims, 1 Drawing Figure

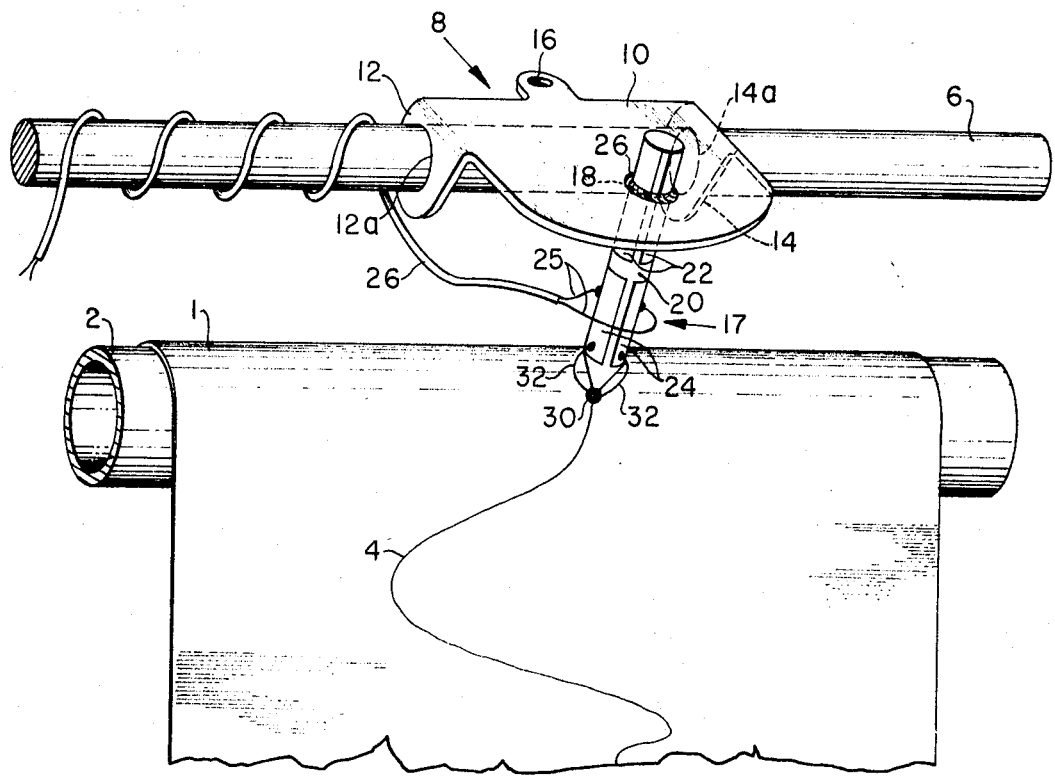

3,735,417

TEMPERATURE REGULATING HEAT-RECORDING STYLUS

Subject matter shown but not claimed herein is shown and claimed in the related U.S. Pat. No. 3,699,588 of Bertil Eck and Michael J. Cash which issued on Oct. 17, 1972 and which is assigned to the same assignee as the present application.

BACKGROUND OF THE INVENTION

This invention relates to recorders. More specifically, the present invention relates to a stylus for use in a recorder for recording on heat-sensitive material. Recorders for producing a visible trace on a recording medium responsive to the application of a source of a localized elevated temperature are well known in the art. Prior art recorders of this type are shown in U.S. Pat. Nos. 1,765,988; 1,820,088; 2,922,688; 2,454,966; 2,478,329 and 3,038,994. However, none of the prior art recorders of this type provide a structure for high-speed analog recording on a heat-sensitive medium. Further, these prior art heat-sensitive medium recorders do not have an inexpensive recording stylus structure capable of self-regulating of a recording temperature as well as being easily replaced and minimizing the electrical power needed to maintain the operating temperature of the stylus.

An object of the present invention is to provide an improved recording apparatus for recording on heat-sensitive material.

Another object of the present invention is to provide an improved stylus for use in a recorder for recording on heat-sensitive material.

A further object of the present invention is to provide an improved heat-generating recording stylus having a self-regulating recording temperature characteristic.

SUMMARY OF THE INVENTION

In accomplishing these and other objects there has been provided, in accordance with the present invention, a recording apparatus using a stylus for generating a localized elevated temperature capable of activating a heat-sensitive recording medium. The stylus includes a mandrel formed from an electrically insulating material capable of withstanding the elevated temperature and arranged to support a pair of separate electrical conductors extending in a longitudinal direction on the surface of the mandrel while being electrically isolated from each other. These conductors are electrically connected to respective wires for connection to a source of electrical power. The conductors are, also, electrically connected to respective sides of a positive temperature coefficient thermistor mounted on a recording end of the mandrel. An attaching means is mounted on the mandrel on a location electrically isolated from the electrical conductors. The attaching means is used to mount the mandrel on a stylus support member arranged to be selectively driven across a heat-sensitive recording medium.

BRIEF DESCRIPTION OF THE DRAWINGS

A better understanding of the present invention may be had when the following specification is read in connection with the accompanying drawing in which the single FIGURE is a pictorial illustration of a portion of a recording apparatus and an enlarged representation of a recording stylus element embodying the present invention.

DETAILED DESCRIPTION

In the single FIGURE drawing there is shown a heat-sensitive recording medium 1 arranged to be driven across a support roller 2 by any suitable transport means (not shown). The heat-sensitive medium 1 may be any suitable recording medium capable of producing a visible recording in response to the application of a localized source of heat, e.g., the recording paper manufactured by the National Cash Register Company of Dayton, Ohio and identified as "Mini Print". The application of a localized source of heat to such a recording medium produces a visible trace recording 4 by the effect of the localized high temperature on the heat sensitive emulsion coating of the recording medium 1. A cylindrical guide rail 6 is provided in the recording apparatus illustrated in the drawing for slidably supporting a stylus holder 8. The stylus holder 8 includes a stylus support plate 10 having a pair of perpendicular ears 12 and 14 on opposite sides thereof. The ears 12 and 14 extend from the plate 10 in the same direction and are each arranged to have a hole therethrough to accommodate the guide rail 6, e.g., holes 12a and 14a, respectively. The holes 12a and 14a are axially aligned with each other and may each include a bushing means, e.g., nylon, (not shown) to facilitate a movement of the stylus holder 8 on the guide rail 6. A means for connecting the stylus support 8 to a recorder drive means (not shown) by a suitable means, e.g., a flexible cable, is provided on the support means 8 in the form of an eye 16.

A stylus 17 for applying heat to a localized area of the recording medium 1 includes a ceramic mandrel 20 which is positioned in a hole 18 extending through the support plate 10 on the opposite side from the location of the eye 16. The mandrel 20 may be any suitable high temperature material which is also an electrical insulator, e.g., aluminum oxide. A first pair of electrically conducting strips 22 are deposited on the mandrel 20 adjacent to one end thereof. The electrical conductors 22 may be of any suitable material, e.g., silver, and may be deposited by any suitable process, e.g., printed circuit technique. The first pair of strips 22 extend from one end of the mandrel 20 to a length approximately one-third of the length of the mandrel 20. The first pair of conducting strips 22 are soldered to the support plate 10 by conventionally applied solder 26 between the support plate 10 and the first pair of the conducting strips 22. A second set of electrically conducting strips 24 are disposed adjacent to the other end of the mandrel 20 in a similar fashion to that used for the first pair of strips 22. The second pair of strips 24 are disposed in a physically separated configuration whereby these strips are electrically isolated from each other and from the first pair of strips 22 by the electrical resistivity of the mandrel 20. The first and second pair of strips 22 and 24 can be formed by a technique wherein they are deposited as two continuous strips extending along the full length of the mandrel 20, and a center portion of each strip is, subsequently, removed by any suitable means, e.g., etching, to form the first and second pairs of conducting strips 22 and 24. Further, since the first pair of strips 22 are only used to provide a convenient means for attaching the stylus 17 to the support plate 10, they need not by physically separated and the preceding discussion is directed to the illustrated embodiment wherein the first and second pairs of strips 22 and 24 are deposited concurrently and are substantially identical in configuration.

The second pair of conducting strips 24 are each attached to a respective one of a pair of electrically insulated electrical conductors 25 contained in an electrical cable 26. The cable 26 is loosely wrapped on the guide rail 6 and is arranged to have its internal electrical leads 25 suitable for connection to a source of electrical power (not shown) while following the motion of the plate 10. The end of the mandrel 20 adjacent to the second pair of strips 24, i.e., a recording end, is arranged to receive a recording element 30. It should be noted that both ends of the mandrel 20 can be formed in this configuration which, in combination with an electrical isolation for all of the conducting strips 20 and 24, and two recording means 30 provide a reversible stylus element. The recording means 30 is a thermistor element attached to the mandrel 20 by any suitable means, e.g., a high temperature cement, and having a pair of electrical leads 32 connected to respective ones of the second pair of conductors 24 on the mandrel 20. A typical size for the thermistor would be approximately 0.030 inch in diameter using a substantially spherical shape for the thermistor 30 to form the recording end of the mandrel 20.

In operation, the stylus 17 of the recording apparatus of the present invention is energized by electrical power applied through the leads 25 of the cable 26. An electrical current is passed through the thermistor 30 to produce a recording temperature of approximately 400° F. on the outside surface of the thermistor element 30. This temperature, when applied to the recording medium 1, is effective to produce the desired reaction in the emulsion coating covering the heat-sensitive recording medium 1 to produce the waveshape 4. The thermistor 30 is arranged to have a positive temperature coefficient of resistance change whereby the resistance and, consequently, the recording temperature is automatically regulated to counteract variations in heat dissipation from the surface of the thermistor 30 during movement of the stylus 17 across the recording medium. These changes in heat dissipation can arise from changes in the speed of the stylus 17, variations in voltage of the power supply energizing the thermistor 17, etc. Thus, the thermistor 30 provides self-regulation of the recording temperature to assure a uniform recording trace 4 without using external means for regulating the recording temperature.

The unbalanced minimal weight of the stylus assembly 17 and the support plate 10 is arranged to exert, in response to gravity, a small downward thrust on the thermistor element 30 to maintain a contact with the recording medium 1 while allowing the recording medium 1 to pass between the stylus 17 and the roller 2. The support member 10 is selectively moved on the guide way 16 in response to recording signals arranged to energize the drive means for the support member 10. The movement of the support plate 10 is effective to move the stylus 17 across the recording medium 1 to produce the recording 4 by means of the heated resistance material 30. This movement of the support member is, also, communicated to the cable 26 which slides on the guideway 6 to follow the motion of the support member 10 while providing an electrical connection to the stylus 17.

The composite stylus 17 can be easily removed from the support member 10 by unsoldering the stylus 17 from the wire 25 and the support member 10, while a new stylus is mounted by a reversal of this process. It should be noted that other means for attaching the stylus 17 to the support member 10, e.g., a spring clip mounted on the support member 10, may be used without departing from the scope of this invention. Further, the stylus 17 may be one of a plurality of similar styli mounted on a common base member and separately energized.

Accordingly it may be seen that there has been provided in accordance with the present invention, a stylus having a self-regulating temperature generating characteristic and a means for supporting the stylus in a recorder for recording on a heat-sensitive recording medium.

The embodiments of the invention in which an exclusive property or privilege is claimed are defined as follows:

1. A recording element comprising an electrically insulating mandrel, a pair of electrical conductors attached to said mandrel, said electrical conductors being electrically isolated from each other and extending over a portion of the surface of said mandrel, means on said mandrel for attaching said mandrel to a support member, said last-mentioned means being electrically isolated from said pair of electrical conductors and a thermistor element supported on said mandrel and extending over a portion of an outside surface of said mandrel to provide a recording surface for contact with a recording medium, said thermistor element having a positive temperature resistance coefficient and being electrically connected between said pair of electrical conductors.

2. A recording element as set forth in claim 1 wherein said thermistor element is supported on one end of said mandrel.

3. A recording element as set forth in claim 1 wherein said mandrel is composed of aluminum oxide.

4. A recording member as set forth in claim 1 wherein said last-mentioned means is a second pair of electrical conductors attached to said mandrel and aligned with said first-mentioned pair of electrical conductors.

5. A recording member as set forth in claim 4 wherein said second pair of conductors and said first-mentioned pair of conductors are plated on said mandrel.

6. A recording member as set forth in claim 1 wherein said last-mentioned means is an area of the surface of said mandrel arranged to be connected to the support member.

7. A recording element as set forth in claim 1 and including means for connecting said pair of electrical conductors to a source of electrical energizing signal.

8. A recording element as set forth in claim 1 and including means for supporting said support member while allowing a movement thereof and means for selectively moving said support member.

* * * * *